United States Patent
Hammoud

(10) Patent No.: US 10,127,448 B2
(45) Date of Patent: Nov. 13, 2018

(54) METHOD AND SYSTEM FOR DISMOUNT DETECTION IN LOW-RESOLUTION UAV IMAGERY

(71) Applicant: BAE Systems Information and Electronic Systems Integration Inc., Nashua, NH (US)

(72) Inventor: Riad Hammoud, Woburn, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 325 days.

(21) Appl. No.: 14/829,171

(22) Filed: Aug. 18, 2015

(65) Prior Publication Data

US 2016/0078272 A1   Mar. 17, 2016

Related U.S. Application Data

(60) Provisional application No. 62/042,434, filed on Aug. 27, 2014.

(51) Int. Cl.
G06K 9/00 (2006.01)
G06K 9/62 (2006.01)

(52) U.S. Cl.
CPC .......... *G06K 9/0063* (2013.01); *G06K 9/6268* (2013.01)

(58) Field of Classification Search
CPC .................. G06K 9/0063; G06K 9/6268
See application file for complete search history.

(56) References Cited

U.S. PATENT DOCUMENTS

| | | | | |
|---|---|---|---|---|
| 6,037,976 A | * | 3/2000 | Wixson | G06K 9/00785 348/122 |
| 9,501,701 B2 | * | 11/2016 | Wood | G06K 9/00711 |
| 9,934,453 B2 | * | 4/2018 | Hammoud | H04W 4/025 |
| 2004/0047492 A1 | * | 3/2004 | Muise | G06K 9/3241 382/103 |
| 2008/0267451 A1 | * | 10/2008 | Karazi | G01S 5/16 382/103 |

(Continued)

OTHER PUBLICATIONS

Chen et al., "Robust extended target detection using nonlinear morphological operations", SPIE Defense, Security, and Sensing. International Society for Optics and Photonics, 2010.*

(Continued)

*Primary Examiner* — Katrina Fujita
(74) *Attorney, Agent, or Firm* — Hayes Soloway; Davis & Bujold, PLLC

(57) ABSTRACT

A method for dismount detection in low-resolution UAV imagery, comprising providing an input image, processing a greyscale distribution of the input image, determining a rough classification in the input image based on the grayscale distribution, determining the optimal parameters based on the rough classification, estimating one or more potential dismount locations, applying an area filter to the one or more potential dismount locations, removing undesired locations from the one or more potential dismount locations, applying one or more secondary filters to the resulting one or more potential dismount locations, assigning a probability to the one or more potential dismount locations, and assessing desirability of the one or more potential dismount locations.

25 Claims, 15 Drawing Sheets

(56) References Cited

U.S. PATENT DOCUMENTS

| | | | | |
|---|---|---|---|---|
| 2013/0322754 A1* | 12/2013 | Lee | ............... | G06T 7/0081 |
| | | | | 382/171 |
| 2013/0329052 A1* | 12/2013 | Chew | ............... | H04N 7/181 |
| | | | | 348/159 |
| 2017/0262732 A1* | 9/2017 | Deng | ............... | G06K 9/6202 |

OTHER PUBLICATIONS

Blasch et al. "Dismount tracking and identification from electro-optical imagery." SPIE Defense, Security, and Sensing. International Society for Optics and Photonics, 2012.*

Yin et al., Chapter 12: Moving Object Localization in Thermal Imagery by Forward-backward MHI, Augmented Vision Perception in Infrared, 2009, pp. 271-291, Springer-Verlag London Limited, United Kingdom.

Stauffer et al., Adaptive background mixture models for real-time tracking, IEEE Computer Society Conference on Computer Vision and Pattern Recognition, 1999, pp. 246-253, vol. 2, IEEE, NY.

* cited by examiner

Potential dismounts extraction and basic filtering (stage 2 – illustration)

METHOD AND SYSTEM FOR DISMOUNT DETECTION IN LOW-RESOLUTION UAV IMAGERY

CROSS REFERENCE TO RELATED APPLICATION

This application claims benefit of U.S. Provisional Application Ser. No. 62/042,434, entitled, "Method And System For Dismount Detection In Low-Resolution UAV Imagery" filed Aug. 27, 2014, the entire disclosure of which is incorporated herein by reference.

STATEMENT OF GOVERNMENT INTEREST

This invention was made with United States Government support under Contract No. N10PC20126 awarded by the U.S. Department of the Interior. The United States Government has certain rights in this invention.

FIELD OF THE INVENTION

The present invention relates to highly-cluttered low resolution aerial imagery and more particularly to the automatic detection/localization of moving humans utilizing wide-area aerial photographic techniques.

BACKGROUND OF THE INVENTION

In the area of aerial reconnaissance, there is a requirement to be able to ascertain the presence of individuals in the presence of clutter for instance both in major urban settings in which the presence of an individual can be confused with other objects in the urban environment, as well as in rural environments in which for instance the presence of an individual can be confused with terrain features. Surveillance of such areas to determine the presence of individuals is often times referred to as dismount detection, which refers to the detection of for instance military personnel leaving a vehicle. This definition has been expanded to include the ability to locate humans for instance as they emerge from buildings and the like and to distinguish them from other animals.

The problem with the aerial surveillance is that when for instance done at high-altitude, the images obtainable at such altitudes are very blurry and composed of very few pixels. The problem therefore is to be able to analyze such blurry objects to ascertain whether or not the blurred object is a result of human activity. Moreover, how to detect low resolution moving objects at high altitudes with for instance a single snapshot for a whole city is difficult.

The purpose of the dismount is to obtain the x, y location of a person in an image. The challenge is to analyze the characteristics of the pixels in the image for instance to ascertain if the object represented by the pixels is moving at a speed having a characteristic motion profile indicative of a human being. Other indications of the presence of human beings are whether the thermal signature is like that emitted by a human being. It is also important to distinguish objects of interest from the background. It is noted that a moving object operates in a variety of conditions and that thermal imaging does not necessarily work to indicate the existence of a dismount. Moreover, different lighting conditions involved in daylight or nighttime surveillance operations and the presence of clouds make thermal signatures weak since the dismounts are not easily separated from background. While bright sunlight can pick up targets, a single threshold does not necessarily work for all lighting conditions.

Thus, dismount detection is a very challenging problem due to the presence of clutter such as similar objects in the background, low pixel-density of dismounts involving 2-30 pixels in size, signal-to-noise ratios, low-contrast difference between dismounts and background, weak thermal signatures, changing perspective of dismounts due to various camera viewing points, camera ego-motion due to the mobile setup when for instance UAVs are involved, parallax, occlusions and significant changes in illumination such as occasioned by day, night and cast shadow conditions. As a result, present methods yield less than 50% detection rates. There is therefore a need to improve on these relatively poor detection rates.

Thus, a heretofore unaddressed need exists in the industry to address the aforementioned deficiencies and inadequacies.

SUMMARY OF THE INVENTION

Embodiments of the present disclosure provide a system and method for dismount detection in low-resolution, high-altitude imagery. In this regard, one embodiment of such a method, among others, can be broadly summarized by the following steps: providing an input image; processing a greyscale distribution of the input image; determining a rough classification in the input image based on the grayscale distribution; determining optimal parameters based on the rough classification; estimating at least one potential dismount location; applying an area filter to the at least one potential dismount location; removing undesired locations from the at least one potential dismount location; applying at least one secondary filter to the resulting at least one potential dismount location; assigning a probability to the at least one potential dismount location; and assessing desirability of the at least one potential dismount location.

The present disclosure can also be viewed as providing methods of improving reliability of dismount detection from low resolution imagery. In this regard, one embodiment of such a method, among others, can be broadly summarized by the following steps: obtaining an input image; and determining from the input image a probability that a portion of the input image corresponds to a dismount by applying a plurality of filtering techniques and image processing techniques, and fusing the results of the plurality of filtering techniques and image processing techniques to ascertain a probability of a dismount in the input image.

The present disclosure can also be viewed as providing methods of improving the reliability of dismount detection in a low resolution input image. In this regard, one embodiment of such a method, among others, can be broadly summarized by the following steps: receiving a low resolution input image from a high altitude, wherein the low resolution input image has a potential dismount; processing the low resolution input image utilizing rough classification filtering; processing the low resolution input image using at least one of: image smoothing, contrast enhancement, multilevel image segmentation, area filtering, blob extraction, contrast filtering, dynamic filtering, thermal filtering, change detection filtering, motion history filtering, clutter identification and shape filtering; and outputting a probability of at least 98% that the potential dismount is a verified dismount.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
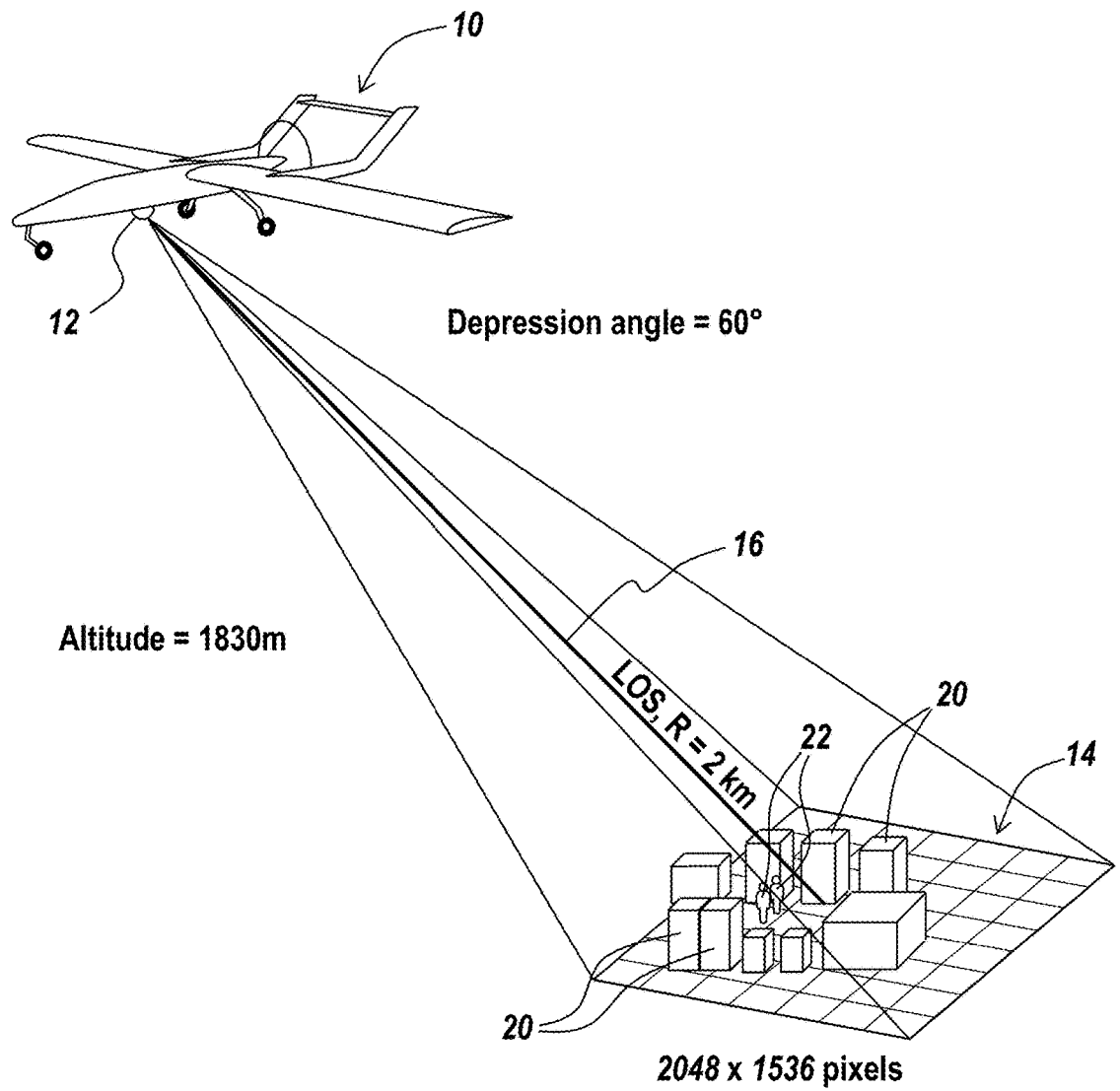
FIG. 1 is a diagrammatic illustration of aerial surveillance of a scene from a relatively high altitude in order to ascertain the presence of individuals within a city environment.

In order to improve reliability to 98%, the subject invention fuses a number of different filtering techniques and image preprocessing to improve target detection, often of dismounts within targets. In accordance with this disclosure, the term "dismount" or a plural variation thereof, is characterized as a human being, but other fixed objects in the scene which are to be targeted can, in some circumstances, also be considered dismounts. The method for dismount detection in low-resolution imagery includes providing an input image, processing a greyscale distribution of the input image, determining a rough classification of the input image based on the greyscale distribution, determining optimal parameters based on the rough classification, estimating one or more potential dismount locations, applying an area filter to the one or more potential dismount locations to remove undesired locations from the one or more potential dismount locations, applying one or more secondary filters to the resulting one or more potential dismount locations, assigning a probability to the one or more potential dismount locations, and assessing desirability of the one or more potential dismount locations to permit tracking.

The step of determining a rough classification may include classifying the input images by time of day. The step of determining a rough classification may include classifying the input images by weather. The step of determining the optimal parameters may include selecting parameters from the group consisting of image smoothing, contrast enhancement, and multi-level image segmentation. The method may further include extracting circumscribed fuzzy areas of the input image called blobs prior to applying the area filtering. The step of applying one or more secondary filters may include applying at least one filter selected from a group consisting of a contrast filter, a dynamic filter, a thermal filter, a change detection filter, a motion history filter, and a clutter identification filter.

More specifically, in one embodiment the subject system includes image classification by first analyzing the scene to determine whether or not it is a sunny day, the scene is cast in shadow, and whether or not night imagery is involved. Having determined the type of scene illumination, image classification based filter parameter adjustment is applied so as to dynamically adjust the filter parameters. This is in turn followed by image smoothing, contrast enhancement and multilevel image segmentation at which point image blobs are extracted. An area filter is used to filter out extracted blobs that are outside a predetermined area, at which point the system extracts potential dismounts. Each extracted potential dismount is passed through a contrast filter, a dynamic filter, a thermal filter, a change detection filter, a motion history filter and a clutter identification filter, with the outputs of these filters fused to ascertain the probability that a potential dismount exceeds a minimum threshold as well as being above a maximum threshold.

Assuming the probability of the potential dismount is above both the minimum threshold and the maximum threshold, it is added to a potential dismount list so that the dismount can be tracked. If the probability of the potential dismount is below the minimum threshold it is rejected, whereas if the probability of the potential dismount is above the minimum threshold but below a maximum threshold then a basic shape constraint filter is applied to ascertain if the blob reflects the presence of a human. If the basic shape constraint is met, this dismount is added to the potential dismount list. With the above preprocessing and filtering it has been found that the accuracy of determining human presence exceeds 98%.

FIG. 1 is a diagrammatic illustration of aerial surveillance of a scene from a relatively high altitude in order to ascertain the presence of individuals within a city environment. In aerial reconnaissance, an unmanned aerial vehicle or drone 10 is provided with a video camera 12 which surveys a region 14 from a high altitude, for instance, an altitude of 1830 meters for a line of sight 16 of 2 kilometers to the center of the surveilled area 14. A series of aerial images may be captured as a sequence of frames, each of which, in one embodiment, may be composed of 2048×1536 pixels. In the survey area 14, a number of man-made objects, such as buildings 20, may be located amongst which individuals 22, most commonly human beings, are to be detected. Beyond an urban landscape, the surveyed terrain may also include natural objects such as rocks and other terrain features such as hills, cliffs, or other features from which human individuals must be distinguished.

Figure 2:
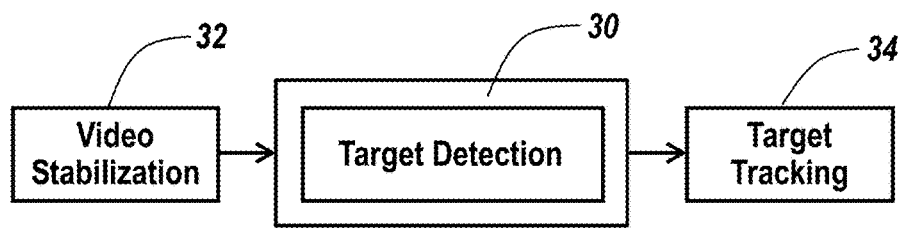
FIG. 2 is a block diagram showing the subject target detection system being fed by stabilized video and followed by target tracking, in accordance with a first exemplary embodiment of the present disclosure.

FIG. 2 is a block diagram showing the subject target detection system being fed by stabilized video and followed by target tracking, in accordance with a first exemplary embodiment of the present disclosure. This aerial image, typically a grayscale image, is processed and classified by the target detection module 30 which has as an input a stabilized video image stream 32. The output of the target detection module may be used in target tracking 34 as the tracked target moves through a sequence of video frames from camera 12 (FIG. 1).

Figure 3:
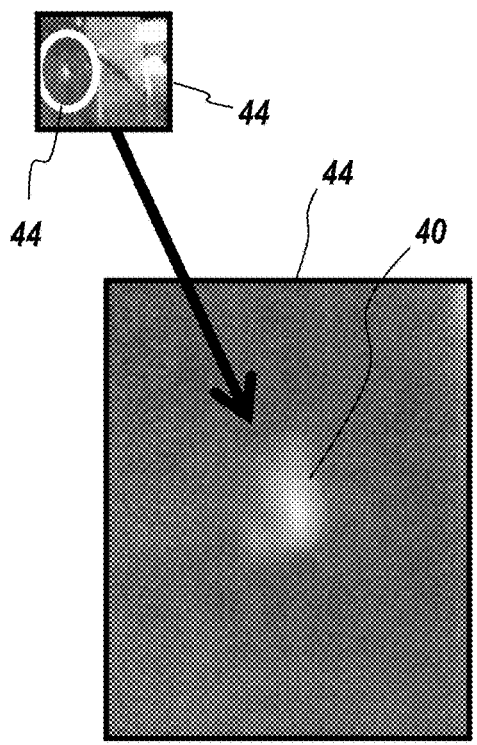
FIG. 3 is a photographic image of a moving dismount taken from a stabilized video frame indicating a blob having elongation and other characteristics indicative of a moving individual, in accordance with the first exemplary embodiment of the present disclosure.
Figure 4:
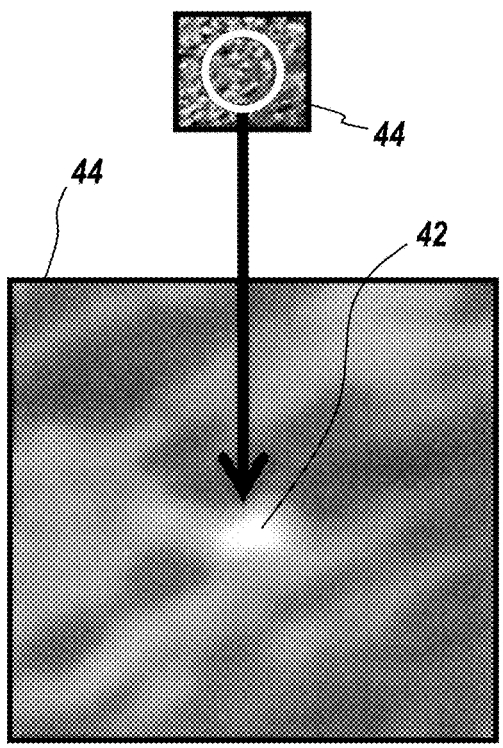
FIG. 4 is a photographic image of a moving target-like object obscured by clutter in the form of parallax, in accordance with the first exemplary embodiment of the present disclosure.

FIG. 3 is a photographic image of a moving dismount taken from a stabilized video frame indicating a blob having elongation and other characteristics indicative of a moving individual, in accordance with the first exemplary embodiment of the present disclosure. FIG. 4 is a photographic image of a moving target-like object obscured by clutter in the form of parallax, in accordance with the first exemplary embodiment of the present disclosure. The difficulty in the target detection is represented by the photographs of FIGS. 3 and 4. As shown, the grayscale image of an object 40 in the scene 44, in this example, taken from 2 miles above the scene, is nothing more than a blurred blob. The number of pixels which comprise the blurred blob 40 can be as little as three and usually does not exceed 30. The pixels of the blurred blob 40 may be analyzed to determine whether or not the blurred blob 40 corresponds to a moving individual, called a moving dismount. As can be seen in FIG. 4 blurred blob 42 takes on the appearance of a moving target-like object obscured by clutter due to parallax. The subject disclosure provides tools for taking a grayscale image from a video camera or other camera and determining whether or not there is a dismount.

Figure 5:
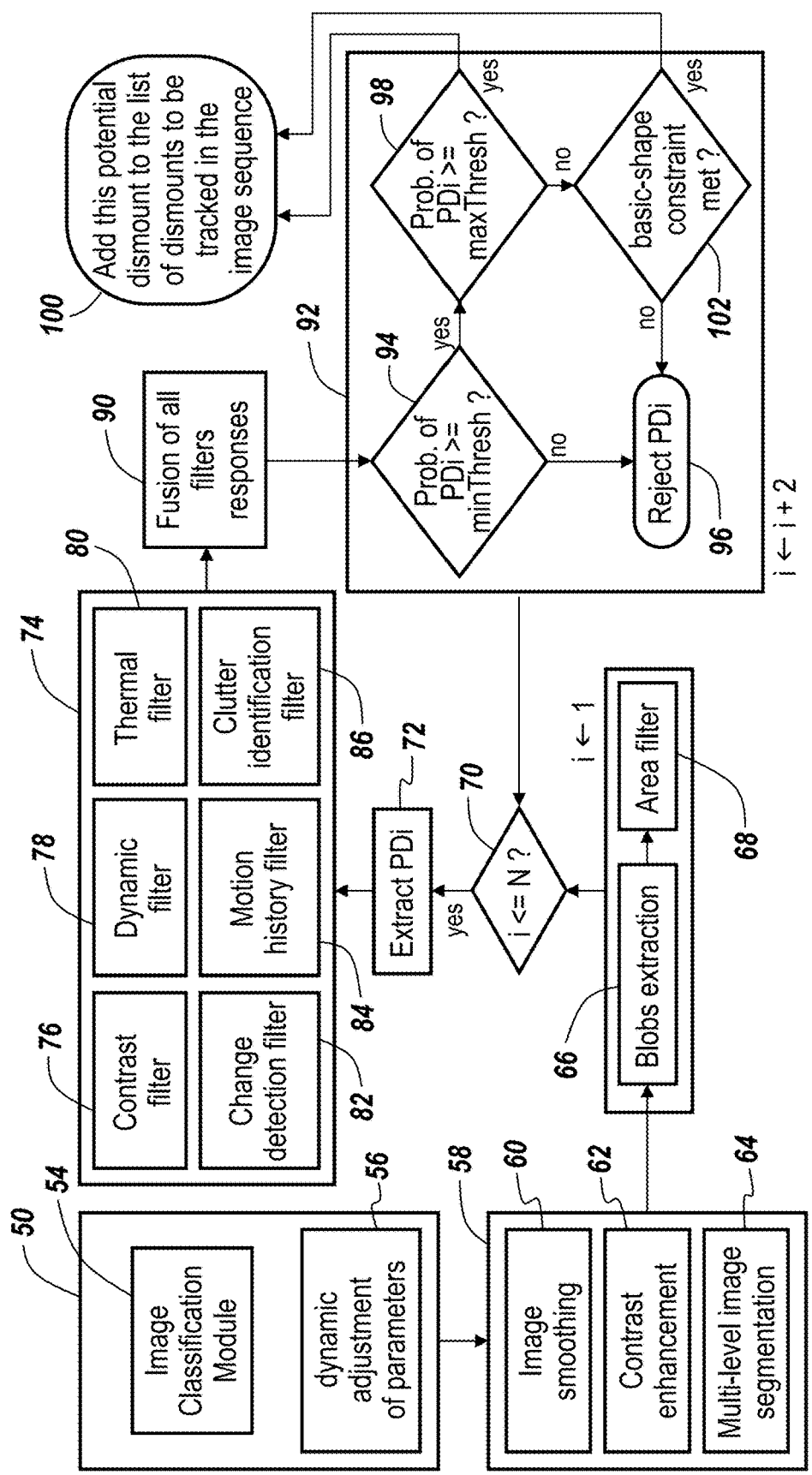
FIG. 5 is a flowchart illustrating multilayer dismount detection, in accordance with the first exemplary embodiment of the present disclosure.

FIG. 5 is a flowchart illustrating multilayer dismount detection, in accordance with the first exemplary embodiment of the present disclosure. The process by which the subject system may determine the existence of a dismount may require various layers of processing and filtering. As illustrated at module 50, a grayscale image is input to an image classification module 54, which classifies the image. For example, the image classification module 54 may classify the image as being representative of a sunny day, a day with cast shadows or is the product of night imagery. This classification function is shown by classification module 54. In one example, the classification method may include (1) computing the gray-scale histogram over the entire input image, or over a set of randomly extracted sub-regions from the input image and (2) determining the histogram modes, e.g., the percentage of pixels with close intensity values within three intervals of intensity values. For example, intensity values of [0, 100] may indicate a night image, values of [101, 185] may indicate an image with cast shadows, and values of [186, 255] may indicate a sunny day. Accordingly, the method may classify the input video frame as either a "night image" or "bright day image" if a single mode is found in the histogram and it is on the left or right side of the histogram, respectively. Otherwise classify the input frame as "cast shadow" image. It is noted that other methods for image classification can also be used, including more advanced, complex approaches using identifiers or classifiers. For example, classification may be achieved by detecting the direction of a shadow in an image, which can indicate a time of day. However, classification based on the intensity values of pixels may be advantageous, as it can be accomplished quickly and without specialized training.

After classifying the image it is then important to make a dynamic adjustment of parameters for the follow-on filtering as illustrated at module 56 with dynamic adjustments dependent upon the classification from module 54. Having derived parameters which are dynamically adjusted, these parameters may be coupled to a processing module 58 that includes an image smoothing module 60, a contrast enhancement module 62 and a multilevel image segmentation module 64, the functions of which are discussed hereinafter.

Having processed the incoming grayscale images utilizing smoothing, contrast enhancement and multilevel image segmentation, it is possible to extract the potential dismount image in the form of a so-called blob, which is an irregular fuzzy area, at blob extraction module 66. To be able to isolate this blob from background of the image, an area filter 68 is employed. These blobs may be a potential dismount, (referred to herein sometimes as a "PDi." If the number of potential dismounts is less than a given number N as illustrated at module 70, the extracted PDi 72 is filtered in a secondary filtering operation 74. The purpose of the secondary filtration is to filter out characteristics of the potential dismounts which are inconsistent with human movement or other human parameters. Filtering module 74 includes a contrast filter 76, a dynamic filter 78, a thermal filter 80, a change detection filter 82, a motion history filter 84 and a clutter identification filter 86.

In first describing the contrast filter 76, the dynamic filter 78, and the thermal filter 80, it is noted that the contrast filter 76 may predominately be used with a single image, where the image is segmented into binary form, thereby resulting in a set of pixels corresponding to a PDi, which corresponds to the blurred blob. Then, the contrast filter determines or calculates the intensity value of the blurred blob relative to the background of the image in which the blurred blob is present. The purpose of the contrast filter 76 is to be able to detect contrasts which are more likely to be those associated with human beings.

The dynamic filter 78, on the other hand, may be used for checking whether the displacement of a PDi between two successive frames is reasonable, which, for a moving dismount, may be based on an empirical estimation of the walking step size of a walking dismount in two successive frames at 30 HZ. The dynamic filter 78 functions by comparing the distance between the center of the image in the previous frame and the peak intensity in the absolute difference image (AD) to a threshold. Thus, the dynamic filter 78 operates with two regions, using a difference in the image based on intensity value and by using a change at the peak intensity. Then, the dynamic filter 78 computes a difference from peak center to the center of the blurred blob. The thermal filter 80 operates by identifying those PDis which are more likely to be those associated with a human based on the blurred blob alone. The thermal filter 80 does not utilize the background of the image, instead, only compares the blurred blob to a predetermined threshold.

Next, the change detection filter 82 detects changes indicative of a moving human being. Moreover, a motion history filter 84 may be used to discriminate against historical movements which are not indicative of a human being. Finally, a clutter identification filter 86 may be utilized to ascertain the presence of clutter and whether or not detected clutter is associated with a moving individual or is background. As illustrated at module 90, the outputs of all the filters may be fused together to arrive at a probability that the potential dismount is associated with an individual. This fusion of the filter outputs takes into account all of the secondary filter characteristics such as thermal signature, changes from one frame to the next, a motion history that is consistent with that of a human being and one in which clutter is identified, among others.

It will be appreciated that the output of module 90 may be a probability that a given PDi corresponds to an individual human being. The probabilities of the potential dismounts are evaluated at module 92 to establish whether the probability of the particular dismount is above a minimum threshold as illustrated at box 94. If the dismount is not above a minimum threshold, the particular PDi is rejected as illustrated at box 96. If the probability of the PDI exceeds a minimum threshold, then this output is routed to a decision box 98 to determine if the probability is greater than a maximum threshold. If so, the identified PDI is added to the potential dismount list of dismounts to be tracked in the image sequence as illustrated at a potential dismount list 100. However, if the probability of the potential dismount does not exceed the maximum threshold, then a basic shape constraint decision block 102 is applied to ascertain if the shape of the blob is more consistent with a human being or something else. If the shape is more consistent with that of a human being, then this potential dismount is added to the potential dismount list 100.

As can be seen, through a series of preprocessing described herein, initial image processing and subsequent secondary filtering of blurred blobs can be accomplished, where blurred blobs which are not indicative of an individual are rejected and blurred blobs which have characteristics that pass muster through all of the above steps are assigned a probability of being an individual. This probability can then be used to determine whether certain minimum and maximum thresholds have been exceeded, to further indicate the presence of a PDi. This reliability in the system establishes that the blurred blob, in fact, is indicative of a dismount, that is to say, the presence of a human being in the surveilled area. Along with the identification of the potential dismount is the location of the potential dismount such that once having determined that a particular potential dismount is reliable enough, it is tracked through conventional tracking mechanisms used in target tracking to establish the movements and whereabouts of human beings in the surveilled area.

It is further noted that the adjustments referred to herein may include additional processing techniques, including smoothing, contrast enhancement, or segmentation. For example, an area filter may be applied to the image and potential dismount locations can be identified. The potential dismount locations are then run through secondary filters. Secondary filters may include a Small Region contrast filter, a Thermal filter, a Clutter filter, a Dynamic filter, a Small Region Motion filter, and a Motion history filter, among others. Thereafter, the desirability of potential dismount locations may be assessed. If the probability of a particular potential dismount location is above a minimum probability threshold, then the location is added to list of potential dismount locations. Furthermore, in the above discussion, the blurred blobs are extracted prior to applying the area filter. Additionally, potential dismount locations that do not exceed a maximum probability are compared to a basic shape constraint, with locations that fall within the shape constraint added to the list of potential locations.

In summary, using the preprocessing, processing, and secondary filtering techniques described herein, it may be possible to significantly increase the reliability that a particular image represents a dismount, including up to a confidence factor of over 98%. The reason for the extremely high reliability, given the paucity of information in the grayscale image, is due to the techniques described herein.

Figure 6:
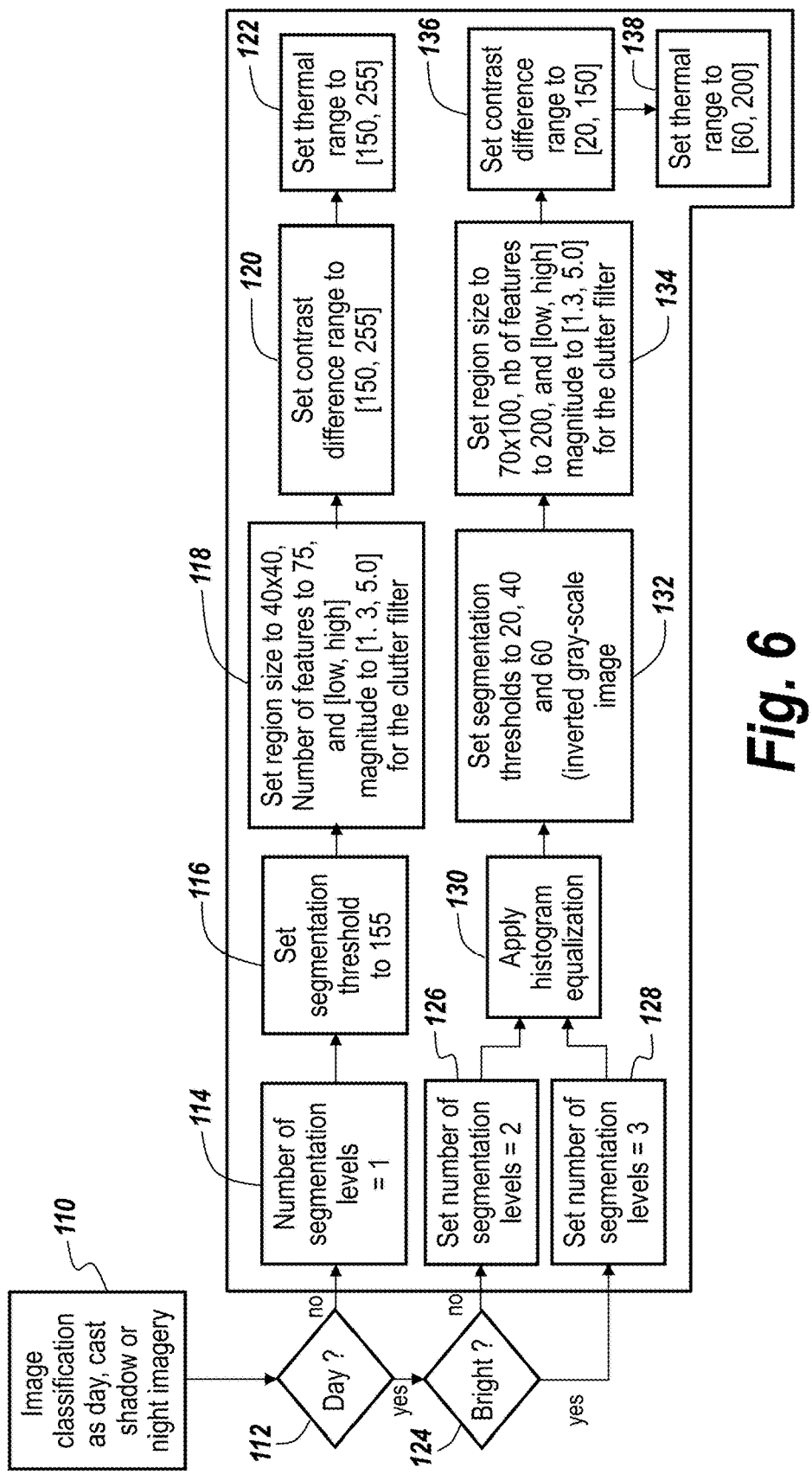
FIG. 6 is a flowchart illustrating the derivation of dynamic adjustments to filter parameters based on image classification in terms of day bright, day cast shadow versus night and adjustment of various parameters accordingly so as to be able to set segmentation thresholds, thermal range thresholds and other filter parameters, in accordance with the first exemplary embodiment of the present disclosure.

Various additional techniques may be used with the multilayer dismount detection framework of FIG. 5. FIG. 6 is a flowchart illustrating the derivation of dynamic adjustments to filter parameters based on image classification in terms of day bright, day cast shadow versus night and adjustment of various parameters accordingly so as to be able to set segmentation thresholds, thermal range thresholds and other filter parameters, in accordance with the first exemplary embodiment of the present disclosure. As shown in FIG. 6, in the first stage of dismount detection at module 110, the overhead images are classified in terms of whether they represent a bright day, a cast shadow day, or a nighttime image. Thereafter, various module parameters are dynamically adapted accordingly, such as segmentation thresholds and thermal ranges.

After image classification as day, cast shadow or night imaging is ascertained, a number of segmentation processes may be invoked in which incoming video frames are filtered out using different techniques. These techniques may utilize a segmentation routine which compares every pixel value in the smoothed mean-shift image to the predefined threshold and labels it as foreground, indicating a potential object of interest, versus as background in the image. The goal of the segmentation is to reduce the number of points in the images that will be filtered out in subsequent processing routines of the proposed detection algorithm, as well as reducing the number of false positives. Accordingly, segmentation may speed up the overall process by focusing in on the pertinent pixels within an image.

For instance, if the overhead image is nighttime as determined at block 112, the number of segmentation levels is set to 1, as illustrated at block 114 and the segmentation threshold is set to 155, as illustrated at block 116. Thereafter, the region size is set to 40×40, and number of features is set to 75, where the number of features refers to the good features to track, such as by utilizing interest points, strong edges, "T and L" shaped corners and maximally stable extremal regions (MSRE) locations in the image sub-region, as is known in the art. Moreover, low/high magnitude may be set to a range of [1.3, 5.0] for [low, high] magnitude of optical flow vectors, for the clutter filter as illustrated at block 118. Here, the "good features" are computed and then the sparse optical flow vectors for these key points between two frames (clutter presence), are computed. Then, the average magnitude of these vectors is computed and compared to a threshold, i.e., (clutter motion). Such measurement may help with distinguishing between potential dismount movements and the "artificial" movements of regions of tall buildings and high grounds (hills, mountains) as they appear moving in the imagery due to parallax. These levels refer to the range of [1.3, 5.0] for [low, high] magnitude of optical flow vectors. Thereafter, the contrast difference range is set to 150, 255 as illustrated at block 120, meaning that the potential dismount is sufficiently different from its surrounding background in terms of intensity values. The thermal range is then set to 150, 255, referring to the max/min thermal ranges as illustrated at block 122. To differentiate between contrast and thermal, while the object contrast may be good to compare to its background, such as a road, etc., its thermal range might fall below threshold range. In such a case, the process may not be propagated forward.

If the image is not representative of night, the image is determined to be indicative of a shaded day or a bright day at block 124. If it is a shaded day, the number of segmentation levels is set to two, as illustrated at block 126, whereas if it is a bright day, the number of segmentation levels is set to three, as illustrated at block 128. At nighttime, one need only have a single segmentation level since segmentation does not need to be run more than once and a fixed threshold may be used. This setting, however, is vastly different in light conditions, which require differing levels of segmentation. The outputs of segmentation level modules 126 and 128 are applied to a histogram equalization module 130. The purpose of the histogram equalization module 130 is to normalize the image using processing. In other words, the histogram equalization module 130 improves the separation between the gray scale values, thereby making the dark portions of the image darker and the bright portions of the image brighter. The output of the histogram equalization module 130 is, in turn, coupled to a segmentation threshold setting module 132 comprising thresholds to 20, 40 and 60 corresponding to an inverted grayscale image. Having set the segmentation thresholds, the output of segmentation threshold setting module 132 is coupled to module 134 which sets the region size to 70×100, the number of features to 200, and low, high magnitude to [1.3, 5.0] for the clutter filter. Thereafter, the contrast difference range is set to 20, 150 as is illustrated at block 136, whereupon the thermal range is set to 60, 200, as illustrated at block 138.

The processing described herein sets the segmentation levels, segmentation thresholds, region sizes, contrast difference ranges and thermal ranges based on the classification of the image as being indicative of night time, shaded daytime, or bright daytime. Generally, binary representations of an image are based on a 0 to 255 pin value scale, as is known in the art. Here, the binary scale is utilized to indicate that a pin value of [0, 100] may indicate a night image, values of [101, 185] may indicate an image with cast shadows, and values of [186, 255] may indicate a sunny day.

Figure 7:
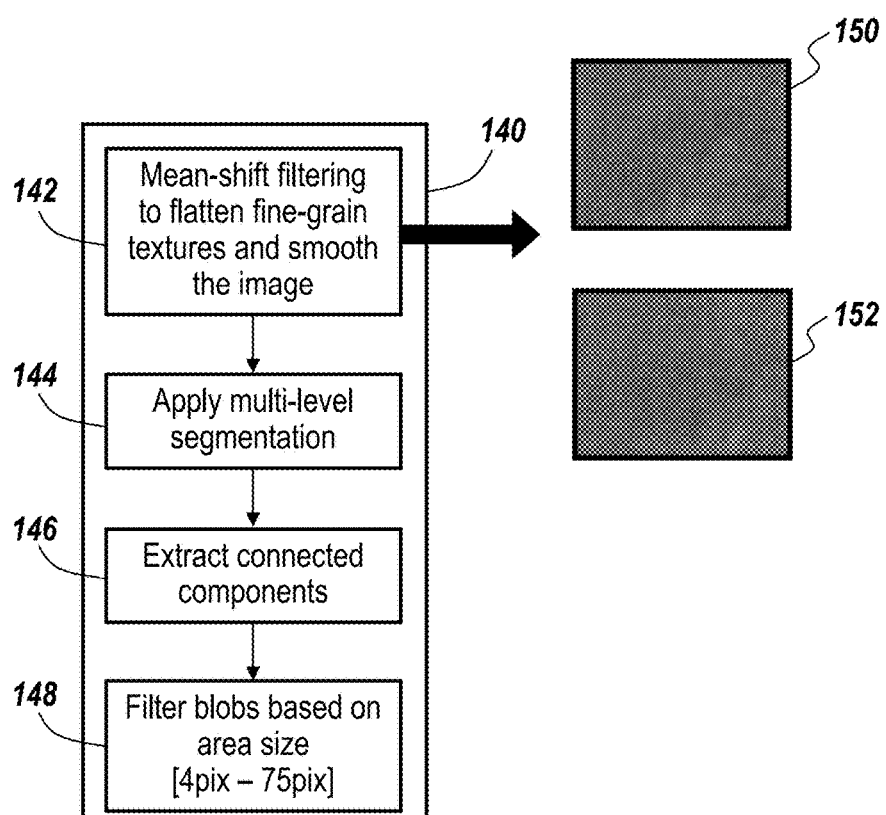
FIG. 7 is a flowchart showing basic image processing and area filtering for significant background noise reduction involving mean-shift filtering, multilevel segmentation, extraction of connected components and the filtering of blobs based on area size, in accordance with the first exemplary embodiment of the present disclosure.

Having set the segmentation levels and filter constraints, the next stage of processing is basic image processing and area filtering. FIG. 7 is a flowchart showing basic image processing and area filtering for significant background noise reduction involving mean-shift filtering, multilevel segmentation, extraction of connected components and the filtering of blobs based on area size, in accordance with the first exemplary embodiment of the present disclosure. As shown, a preprocessing module 140 may include a number of components, namely mean-shift filtering to flatten fine-grained textures and smooth images module 142, a multi-level segmentation module 144, an extract connected components module 146, and a filter blobs based on area size module 148.

The mean-shift filtering to flatten fine-grained textures and smooth images module 142 is utilized to significantly reduce background noise as illustrated at image 150, in comparison to the noisy background image 152. Mean-shift filtering refers to taking an input image and processing the proximity of pixels. This routine finds local minimums and generates another image called the "big pixel image", referring to a small, homogenous cluster, with the big pixel image labeled corresponding to different segments. The big pixel image is used as a smoothed version of the input image and further in the multi-level segmentation routine which generates the initial set of potential dismounts. When the routine is applied, noise can be eliminated.

As to multi-level segmentation at the multi-level segmentation module 144, it will be appreciated that threshold and the grayscale image can be used to obtain circumscribed images called 'blobs'. In general, there are three thresholds with each thresholding path generating a number of different potential dismount candidates. After thresholding, connected components are extracted, as is well-known in the art. In this process, two different methods may be used: full connectivity and 8-connectivity, utilizing 8 neighboring pixels. In either case, an algorithm is used with the generated binary image to look at the connectivity of binary pixels in the image. The binary pixels are then put together based on either the full connectivity approach or the 8-connectivity approach.

Figure 8:
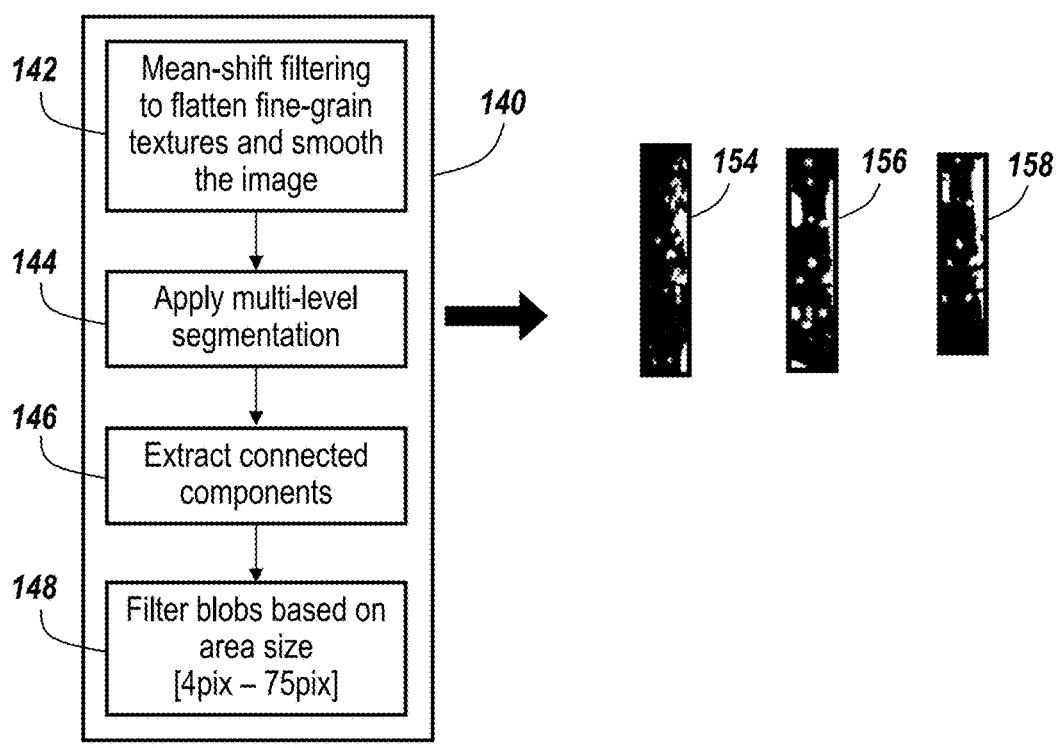
FIG. 8 is a flowchart of the basic image processing and area filtering of FIG. 7 illustrating obtaining potential dismounts utilizing several multi-level segmentation thresholds, with the results illustrated by the photographs to the right of the flowchart, in accordance with the first exemplary embodiment of the present disclosure.

FIG. 8 is a flowchart of the basic image processing and area filtering of FIG. 7 illustrating obtaining potential dismounts utilizing several multi-level segmentation thresholds, with the results illustrated by the photographs to the right of the flowchart, in accordance with the first exemplary embodiment of the present disclosure. The purpose of generating the multi-level segmentation results in obtaining potential dismounts utilizing several thresholds as illustrated at sample potential dismounts 154, 156, and 158, with the segmentations showing different aspects of the grayscale image. As can be seen, each of the sample potential dismounts 154, 156 and 158 represents one of three different thresholds resulting from the output of the multi-level segmentation module 144. Within the sample potential dismounts 154, 156, and 158, the white area or blobs represent dismounts, and their positioning relative to the background of the image, the black areas, are used to focus the processing. For example, in sample potential dismount 154, it can be seen that the white areas are connected together, whereas in sample potential dismount 156, the white areas are the most separated. The three sample potential dismounts 154, 156, and 158 illustrate that different thresholds provide different outputs of white and black areas. If the three different thresholds are combined, it may be possible to better see the dismounts, since combining the thresholds may build them into a single set of connected components (white areas/blobs), which can be filtered out further.

Figure 9:
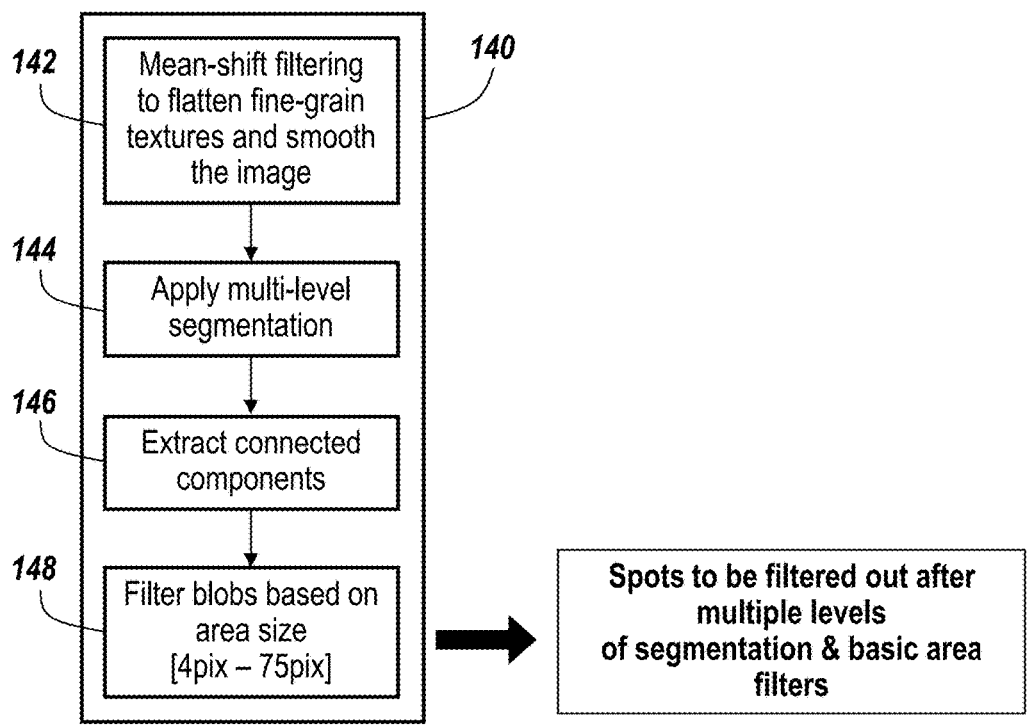
FIG. 9 is a flowchart of the basic image processing and area filtering of FIG. 7 indicating blobs filtered on area size resulting in the filtering out of spots after multiple levels of segmentation and the extraction of connected components, in accordance with the first exemplary embodiment of the present disclosure.

Next, in the extract connected components module 146, the connected white areas/blobs can be extracted as connected components, as previously described. FIG. 9 is a flowchart of the basic image processing and area filtering of FIG. 7 indicating blobs filtered on area size resulting in the filtering out of spots after multiple levels of segmentation and the extraction of connected components, in accordance with the first exemplary embodiment of the present disclosure. As shown in FIG. 9, after the extraction of connected components at module 146, the resulting blobs are filtered based on area size, which filters out spots after multiple levels of segmentation and basic area filtration. Any blobs over a certain size or under a certain size may be eliminated at module 148, which limits the presented blobs to a limited size area and eliminates artifacts that should not be considered in the determination of a dismount.

Figure 10:
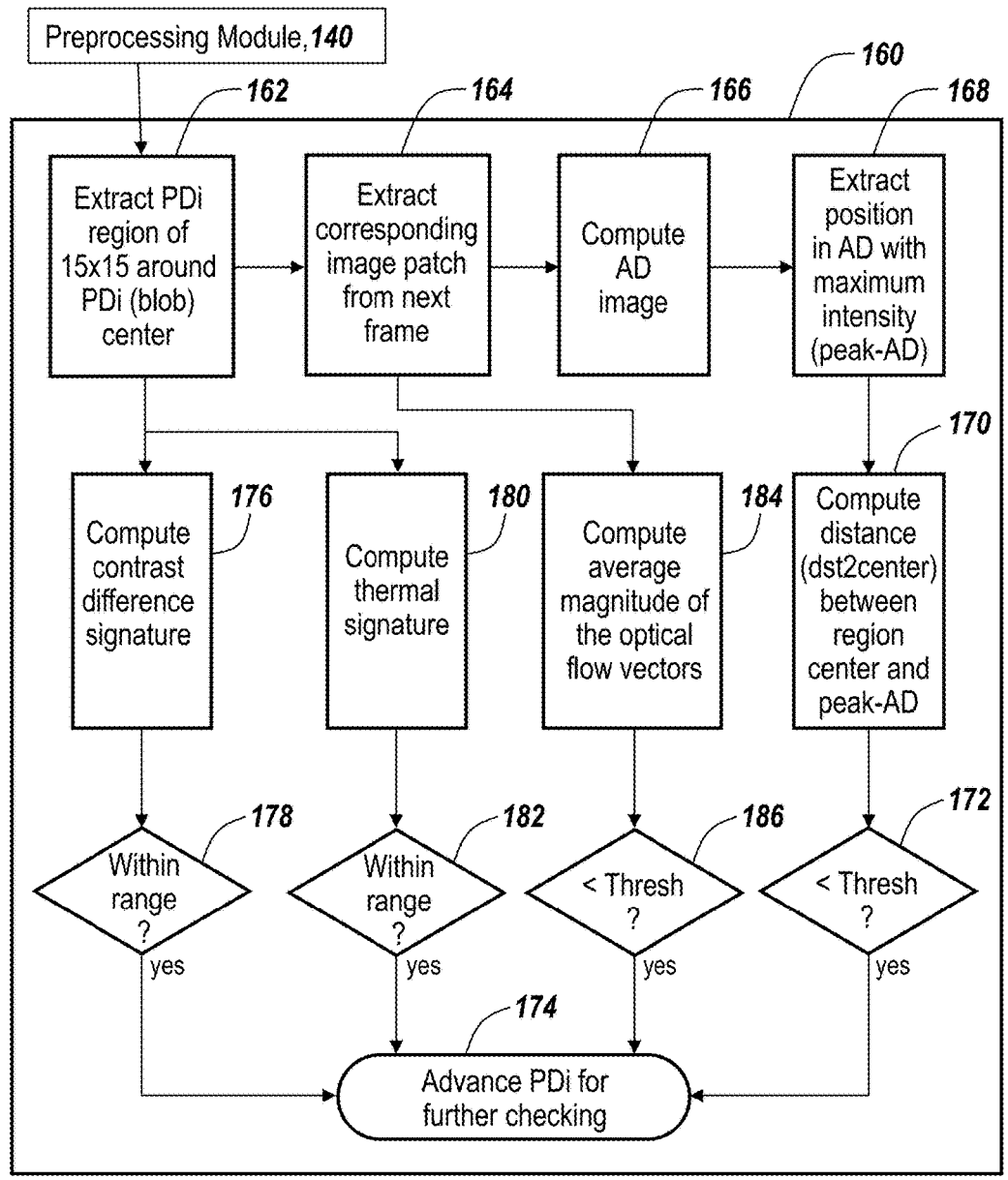
FIG. 10 is a flowchart of basic filtering to filter out potential dismounts based on thermal, contrast and displacement to ascertain whether or not these components are within preselected ranges or thresholds, and if so, advancing the potential dismount for further checking, in accordance with the first exemplary embodiment of the present disclosure.

Having performed the basic image preprocessing and area filtering, a second stage of filtering may be used to filter out potential dismounts based on thermal, contrast and displacement. FIG. 10 is a flowchart of basic filtering to filter out potential dismounts based on thermal, contrast and displacement to ascertain whether or not these components are within preselected ranges or thresholds, and if so, advancing the potential dismount for further checking, in accordance with the first exemplary embodiment of the present disclosure. As shown in FIG. 10, module 160 takes the output of preprocessing module 140, first, into module 162, wherein the system first extracts a potential dismount region of 15×15 around the potential dismount blob center. This extraction limits the consideration of the dismounts to a fairly small region centered around the center of the blob. As illustrated at module 164, utilizing this extracted region, the subject system extracts a corresponding image patch from the next frame, followed by computing the absolute difference (AD) of the image at module 166. This processing makes it possible to ascertain any difference between a first image patch, a second image patch and subsequent frames in terms of absolute difference. As illustrated at module 168, the position of the absolute difference image having maximum intensity, namely peak absolute difference, is extracted. As illustrated at module 170, the distance to the region center from the peak absolute difference is calculated. As illustrated at module 172, if this distance to center is less than a predetermined threshold then the potential dismount is advanced for further checking, as illustrated at module 174.

From the extracted potential dismount that exists in a region of 15×15 around the blob center, as illustrated at block 176, the subject system computes the contrast difference signature between two successive frames. If the contrast difference signature is within a predetermined range, as illustrated at block 178, this extracted potential dismount is advanced for further checking at block 174. Thus, the difference in contrast signatures is used as a discriminator for human detection. For the extracted potential dismount in the 15×15 region around the blob center, the thermal signatures are computed, as illustrated at block 180. If the thermal signatures are within a range, as illustrated at block 182, corresponding to the presence of an individual, then the extracted potential dismount is advanced for further checking at block 174.

As can be seen, the extracted corresponding image patch from the next frame is utilized at block 184 in the measurement of movement of the image in terms of the average magnitude of the optical flow vectors. If the average magnitude of the optical flow vector is less than the threshold set at 186, the extracted potential dismount is advanced for further checking at block 174. It will be appreciated that the average magnitude of the optical flow vector is a measure of the motion between successive frames of the object in the image. The average magnitude of the optical flow vector being below a certain threshold is indicative of human activity, especially in low resolution overhead images.

Figure 11:
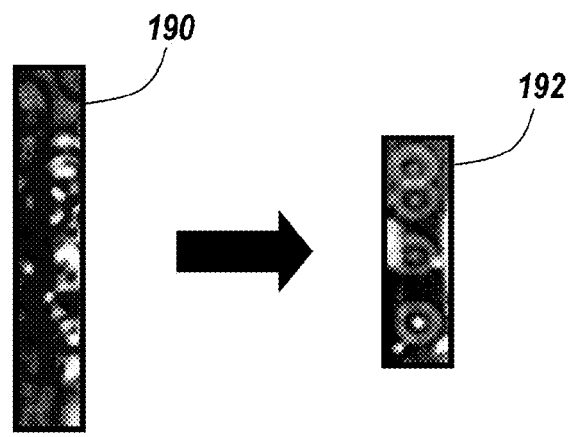
FIG. 11 is a series of photographs illustrating potential dismount extraction and basic filtering, in accordance with the first exemplary embodiment of the present disclosure.

FIG. 11 is a series of photographs illustrating potential dismount extraction and basic filtering, in accordance with the first exemplary embodiment of the present disclosure. In FIG. 11, images 190 and 192 are provided, where the above filtering results in the extraction of potential dismounts that satisfy the basic filtering criteria. Here, it can be seen that the relatively cluttered image 190 is converted into regions in the image for which blobs are isolated and are presented only if the blob and corresponding human activity is associated with a dismount. Cluttered image 190 represents the input image with one level of segmentation. At image 192, the output of the filtering is shown. When the basic filters are applied, the number of connected components are reduced, which eliminates many of them, thereby reducing the number of candidates. The candidates in the images 190, 192 may be identified with color-based circles or other shapes, which can be used to indicate a confidence of the potential candidate. For example, in image 190, a blue circle around the candidate (the dot), can be used to indicate a low confidence of the candidate being a dismount, whereas in image 192, the circle may be colored green to indicate that the confidence of the candidate is higher after processing. Other colors can be used to show other criteria of the candidate, such as rejection of the candidate.

Figure 12:
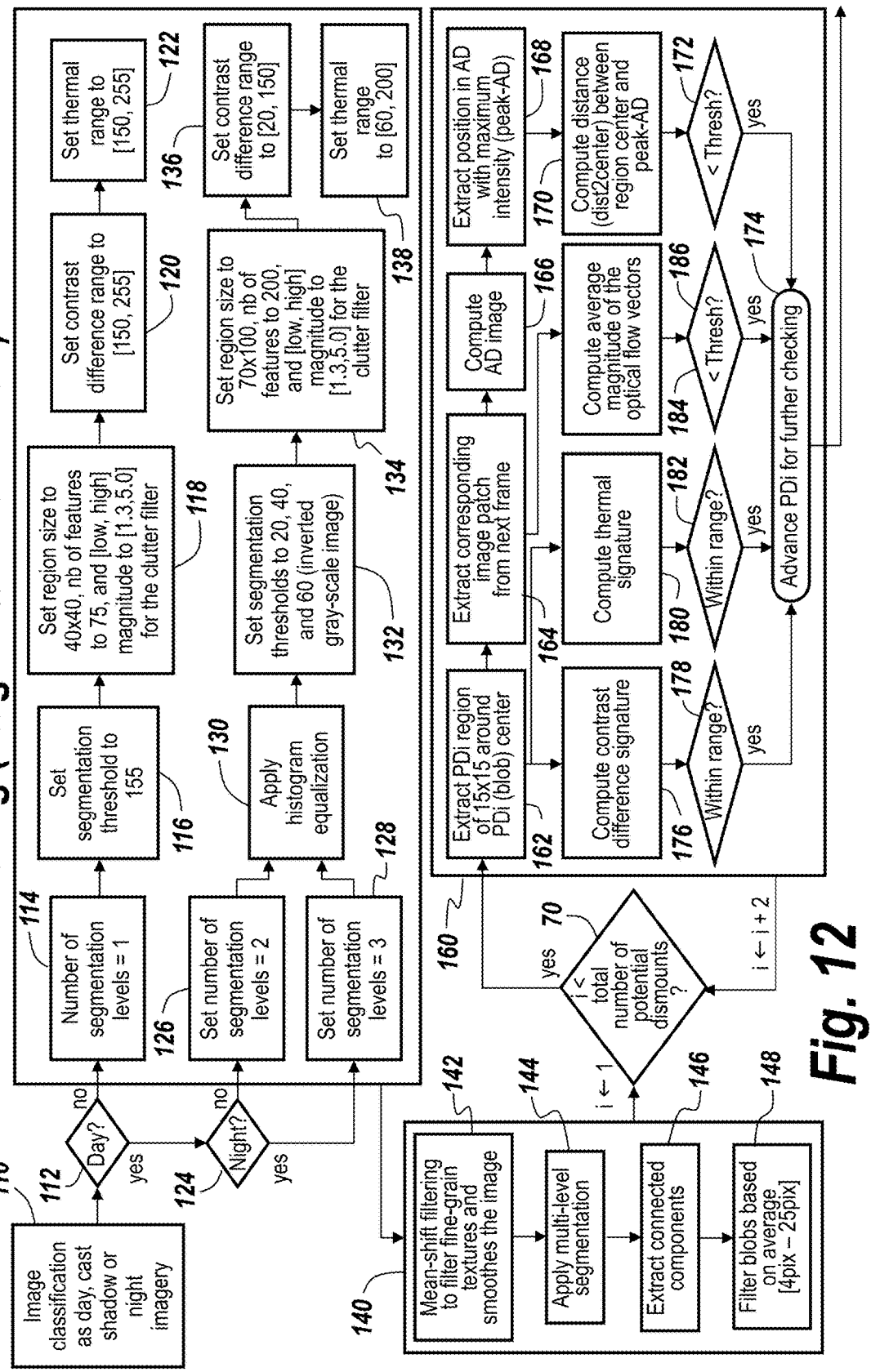
FIG. 12 is a flowchart illustrating an overview of the filtering in terms of the derivation of filter parameters by way of segmentation level based on image classification, also illustrating the extraction of potential dismount regions, extraction of corresponding image patches from next frames, Absolute Difference image computation and the extraction of position of the Absolute Difference image with maximum intensity, followed by the computation of contrast difference signatures, the computation of thermal signatures, the computation of the average magnitude of optical flow vectors and the computation of the distance between region centers and peak-Absolute Difference, in accordance with the first exemplary embodiment of the present disclosure.

FIG. 12 is a flowchart illustrating an overview of the filtering in terms of the derivation of filter parameters by way of segmentation level based on image classification, also illustrating the extraction of potential dismount regions, extraction of corresponding image patches from next frames, Absolute Difference image computation and the extraction of position of the Absolute Difference image with maximum intensity, followed by the computation of contrast difference signatures, the computation of thermal signatures, the computation of the average magnitude of optical flow vectors and the computation of the distance between region centers and peak-Absolute Difference, in accordance with the first exemplary embodiment of the present disclosure. In particular, FIG. 12 describes an overview of the first and second stages, in which like processing steps or modules are indicated by like reference characters. Here, it can be seen that image classification is a day or night classification, which is utilized to set a number of parameters prior to preprocessing at module 140. It is noted that, as illustrated at block 70, if the total number of potential dismounts is less than a predetermined number, then the basic filtering at block 160 is allowed to occur. This basic filtering involves contrast difference signatures, thermal signatures, optical flow vectors and the distance between a region center and a peak absolute difference image, all of which are used to filter out images that do not correspond to human activity.

Figure 13:
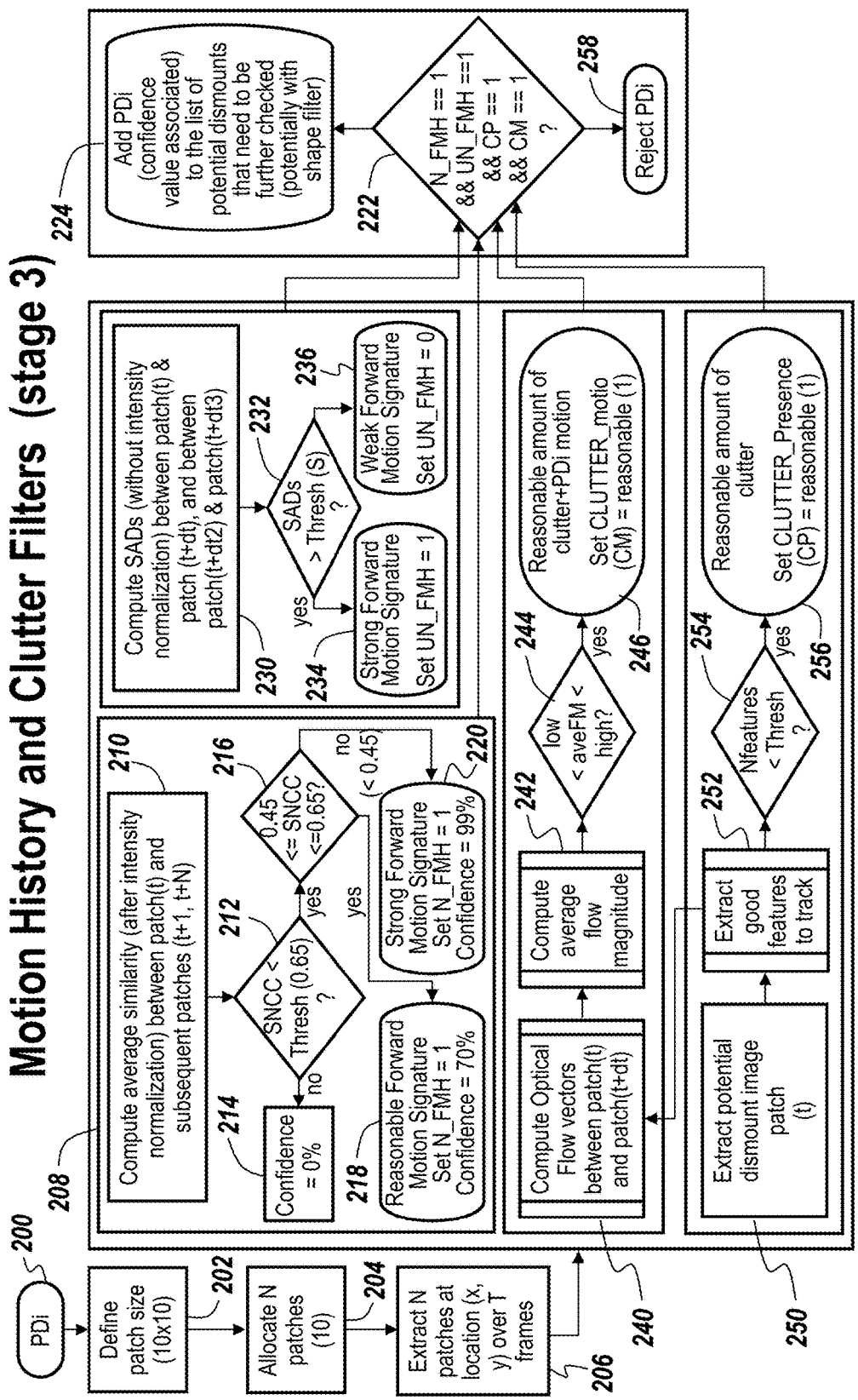
FIG. 13 is a flowchart illustrating motion history detection and clutter filtration, in accordance with the first exemplary embodiment of the present disclosure.

FIG. 13 is a flowchart illustrating motion history detection and clutter filtration, in accordance with the first exemplary embodiment of the present disclosure. As shown, a further filtration to eliminate nonhuman objects includes motion history and clutter filters in a third stage of the subject process. In this portion of the process, the system takes, for instance, 10 frames and computes out patches to form a history based on normalized cross-sections (NCCs). For a given potential dismount, as illustrated at block 200, a patch size of 10×10 is defined in block 202, at which point a number of patches (N) is allocated, as illustrated at block 204. The system then extracts N patches at a particular location over T frames as illustrated at block 206. In one portion of this subroutine, the system ascertains whether there is a strong forward motion signature or a weak forward motion signature. As can be seen at block 210, the system computes the average similarity between a patch and any subsequent patch after intensity normalization. The average similarity (SNCC), meaning Similarity Normalized Cross Section, is thresholded at block 212 to ascertain if the average similarity has a zero confidence level, as illustrated at block 214, or has one of two different confidence levels, as determined at block 216. The two different confidence levels are a reasonable forward motion signature, wherein N_FMH is set equal to 1 for a 70% confidence level as illustrated at block 218, or is set at 220 equal to 1 for a confidence level of 99% to indicate a strong forward motion signature. For either of these two cases, as illustrated by block 222, the associated potential dismount is added to the list to be further checked with the shape filters, as illustrated at block 224.

As illustrated at block 230, another way of computing strong forward motion or weak forward motion is by computing the Sum of Absolute Differences (SADs) without intensity normalization between a number of successive patches. The SADs are thresholded at block 232, such that if greater than a predetermined threshold a strong forward motion signature is indicated as illustrated at block 234, such that UN_FMH is set to 1. If the thresholded SAD is less than the threshold established at block 232, then a weak forward motion signature is set at block 236 such that UN_FMH is set to 0. If the computed SADs indicate a strong forward motion signature, this output is applied to block 222. Thus, block 222 has two basic measures of forward motion, SNCC and SADs. The forward motion is that associated with the motion of a human being. With a sufficient forward motion history, the potential dismount is added to the list of potential dismounts at block 224, as indicated above.

Decision block 222 is also utilized to determine if there is too much clutter in the extracted patches. An acceptable amount of clutter, meaning a reasonable amount of clutter, is determined by the computation of optical flow vectors between two patches as illustrated at block 240. The average flow magnitude is calculated at block 242 and if the average flow is banded between a low value and a high-value, as illustrated at block 244, it is ascertained that a reasonable amount of clutter and PDi motion is present, as illustrated at block 246. Thus, clutter motion (CM) is set to be reasonable, as indicated by setting CM=1. This is coupled to block 222 to indicate that the image in the extracted patch exhibits reasonable clutter based on flow vector magnitudes.

Another way of ascertaining that a potential dismount image corresponds to human activity is to extract a potential dismount image patch, as illustrated at block 250, and then to extract so-called good features to track, previously described, as illustrated at block 252. As illustrated at block 254, if there are number of extracted features, N, less than a predetermined threshold, then is it is possible to ascertain that there is a reasonable amount of clutter present, as illustrated at block 256 and where CP is set equal to 1. This output is applied to block 222 and if the clutter ascertained by this method is below a predetermined acceptable amount, then clutter presence (CP) is deemed to be acceptable and the associated potential dismount is added to list of potential dismounts at block 224. If, for any reason, the inputs to decision block 222 fail for a given potential dismount, this potential dismount is rejected, as illustrated at block 258. Within this processing, sparse optical control vectors may be used, where the vectors are computed for key points only, as opposed to every pixel in the image region.

Figure 14:
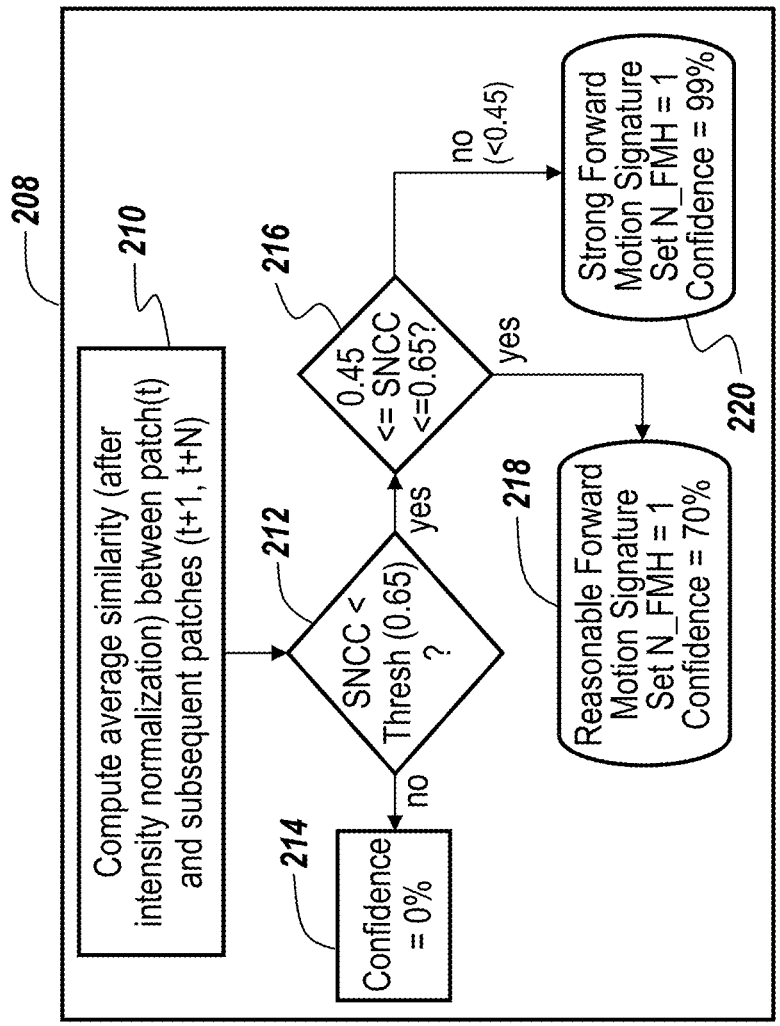
FIG. 14 is a flowchart showing the derivation of a forward motion history signature for each potential dismount by performing cumulative patch-to-patch cross correlation normalizations, followed by assigning a confidence value to each potential dismount in terms of weak, moderate and strong forward motion history signatures, in accordance with the first exemplary embodiment of the present disclosure.

FIG. 14 is a flowchart showing the derivation of a forward motion history signature for each potential dismount by performing cumulative patch-to-patch cross correlation normalizations, followed by assigning a confidence value to each potential dismount in terms of weak, moderate and strong forward motion history signatures, in accordance with the first exemplary embodiment of the present disclosure. As shown, the forward motion history signature (FMHS) at block 208 refers to an estimated forward motion history signature for each potential dismount which is performed cumulatively patch to patch utilizing a Normalized Cross-Correlation (NCC) process. After the normalized cross correlation, a confidence value is assigned to each potential dismount. For a weak forward motion history signature the confidence value refers to noise and registration errors. For a moderate forward motion history signature, this refers to the detection of slow-motion or move-stop motion that could conceivably indicate the motion of an individual. For strong forward motion history signatures, this refers to the detection of a moving dismount and is accorded a confidence level of 99%.

Figure 15:
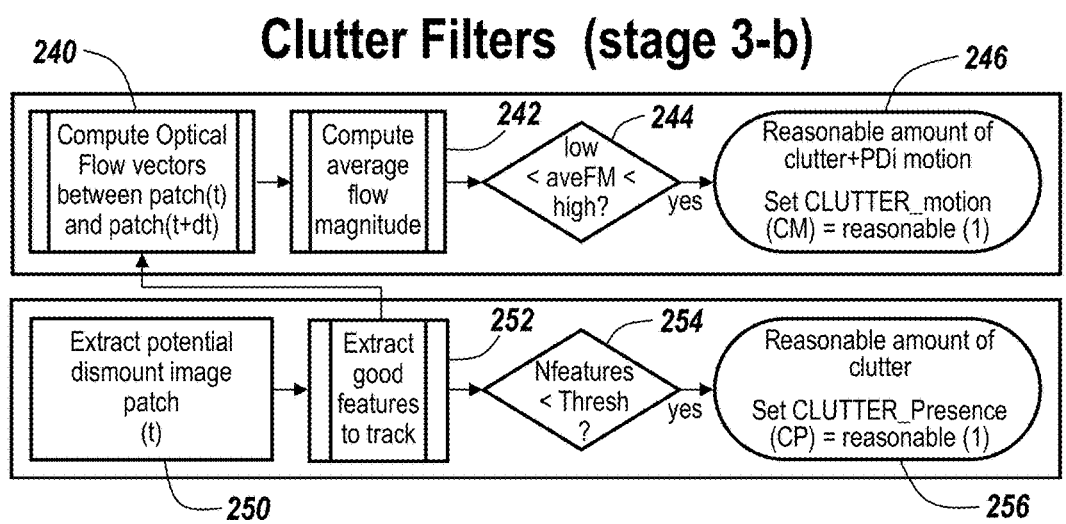
FIG. 15 is a flowchart showing clutter filters which operate by computing optical flow vectors between patches and the computation of average flow magnitude, as well as extracting good features to track and thresholding to indicate whether or not there is a reasonable amount of clutter present, in accordance with the first exemplary embodiment of the present disclosure.

FIG. 15 is a flowchart showing clutter filters which operate by computing optical flow vectors between patches and the computation of average flow magnitude, as well as extracting good features to track and thresholding to indicate whether or not there is a reasonable amount of clutter present, in accordance with the first exemplary embodiment of the present disclosure. In FIG. 15, the clutter filters describe two different ways of ascertaining the presence of clutter involving either flow vectors between patches or the presence of good features to track as opposed to those features which are considered to be in the background. The result of clutter filtering is to eliminate background features which might be considered to be associated with an individual by ascertaining that the amount of clutter measured by either of these two ways is not that associated with background. A definition of clutter may include a small number of key points, such as corners or edges, and reasonable motion magnitude. Separate from image noise, clutter may include something that appears like a target which is positioned in front of a target.

Figure 16:
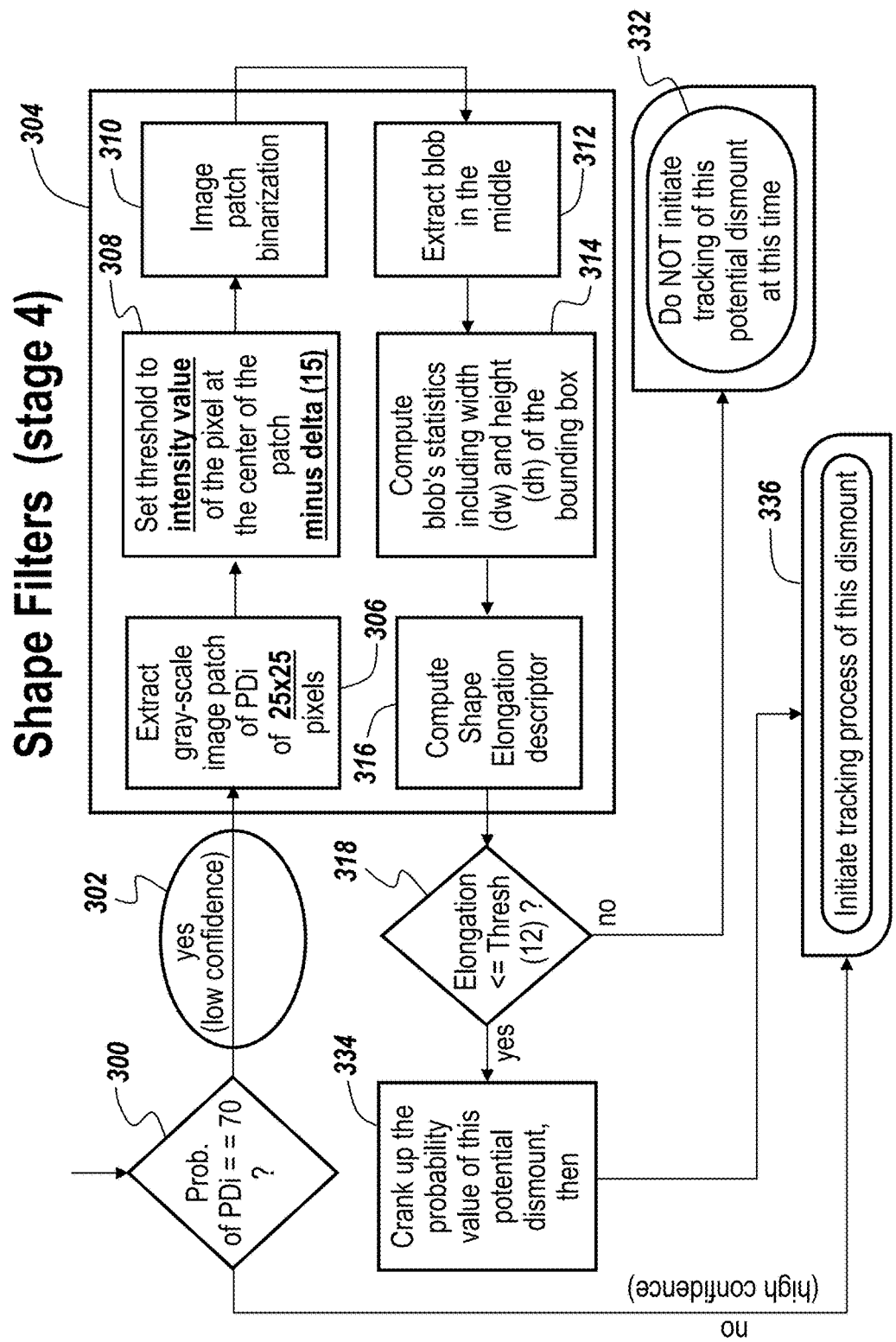
FIG. 16 is a flowchart showing the operation of shape filters, in accordance with the first exemplary embodiment of the present disclosure.

FIG. 16 is a flowchart showing the operation of shape filters, in accordance with the first exemplary embodiment of the present disclosure. Having ascertained that a dismount is most likely present, any doubt as to its reliability is resolved by shape filters. In FIG. 16, if the probability of a potential dismount as illustrated at block 300 has a low confidence level, for instance being below 70, this low confidence level at block 302 is coupled to a shape filter 304, which first extracts a grayscale image patch of the potential dismount at 306 with the patch size equal to 25×25 pixels. The extracted image patch at block 306 is thresholded at block 308 as to the intensity value of the pixels at the center of the patch minus a predetermined delta. Intensity value thresholding is followed by image patch binarization at block 310, as previously explained. As illustrated at block 312, the blob in the middle of the images is extracted and, as illustrated at block 314, the blob statistics including the height of the bounding box surrounding the blob is computed. Thereafter, as illustrated at block 316, a shape elongated descriptor is computed and, as illustrated at block 318, if the elongation is equal to or less than a predetermined threshold, then the associated PDi is rejected such that tracking of this potential dismount is not initiated, as illustrated at block 332. If elongation is greater than the predetermined threshold at block 318, then the probability of the value of this particular potential dismount is increased as illustrated at block 334 and tracking is initiated for this potential dismount, as illustrated at block 336. On the other hand, if the confidence level is very high for the particular potential dismount, as determined by decision block 300, then tracking is initiated for this potential dismount.

Figure 17:
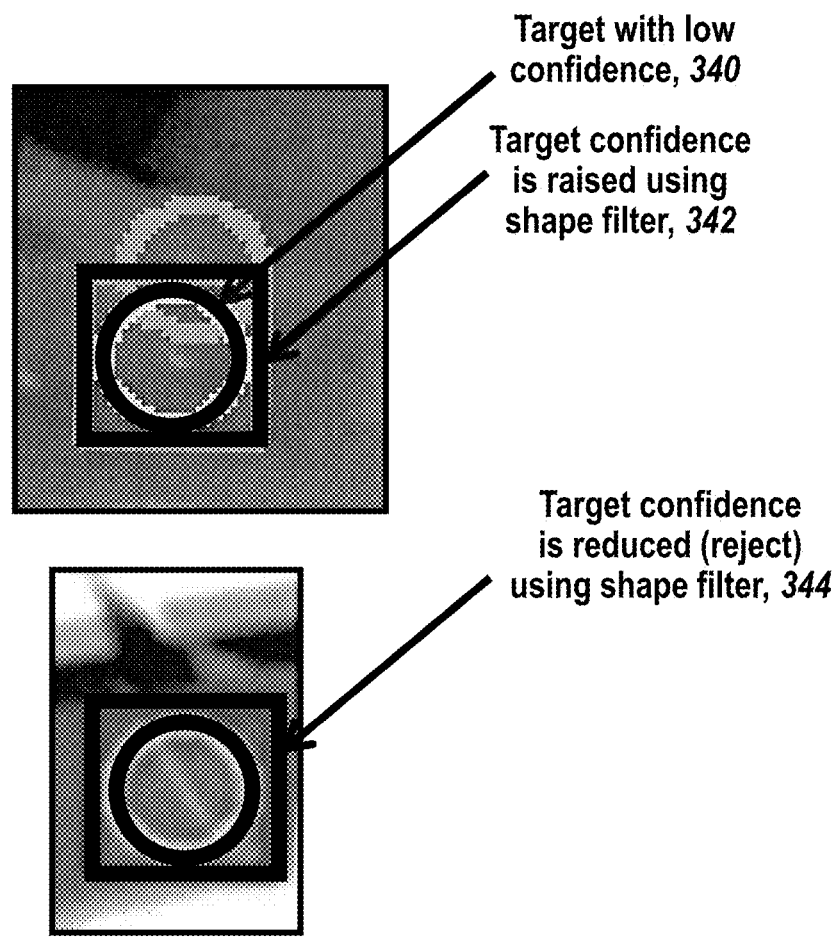
FIG. 17 is a series of photographs illustrating the results of targets with low confidence raised by using a shape filter and in which target confidence is reduced as a result of the application of the shape filter, in accordance with the first exemplary embodiment of the present disclosure.

FIG. 17 is a series of photographs illustrating the results of targets with low confidence raised by using a shape filter and in which target confidence is reduced as a result of the application of the shape filter, in accordance with the first exemplary embodiment of the present disclosure. As can be seen, a target 340 with low confidence may be identified with a geometric indicator, such as a circle or square, which may be color coded to indicate a confidence level of the target 340 being a dismount. The confidence of this dismount may be raised using shape filters, as illustrated at target 342. Further, as illustrated at target 344, there is a reduced target confidence when using this shape filter such that the potential dismount is rejected by the subject system. As a specific example, the targets 340, 344 of FIG. 17 may provide an example of a potential dismount which is actually a light pole, such that the shape filter gave a very low confidence score. Applying the shape filter may clearly show the potential dismount is actually a light pole. Both targets 340, 344 may originally have a low confidence, but when the shape filter is applied, the target 344 is clearly shown to be a lamp pole and the other target 340 is shown to be an actual dismount.

In summary, what is accomplished is to take an input image, classify it as to daytime and nighttime brightness, set up dynamic special models based on the classification, utilize filters in terms of segmentation to eliminate large blobs and utilize further filtration for low resolution images, followed by shape filtration, motion history filtration and thermal signature filtration to extract reliable dismounts.

While the present invention has been described in connection with the preferred embodiments of the various Figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for dismount detection in a single low-resolution, high-altitude image, comprising;
   providing a single input image;
   processing a grayscale distribution of the single input image;
   determining a rough classification of the single input image based on the grayscale distribution and without the use of any reference images;
   determining optimal parameters based on the determined rough classification for the single input image without the use of any reference images;
   estimating at least one potential dismount location;
   extracting blobs from the single input image without the use of any reference images;
   applying an area filter to the at least one potential dismount location;
   removing undesired locations from the at least one potential dismount location;
   applying at least one secondary filter to the resulting at least one potential dismount location wherein the at least one secondary filter comprises applying at least two of: a contrast filter, a dynamic filter, a thermal filter, a change detection filter, a motion history filter, and a clutter identification filter;
   fusing the results of the at least two secondary filters;
   assigning a probability to the at least one potential dismount location; and
   assessing desirability for initiating tracking of the at least one potential dismount location.

2. The method of claim 1, wherein the step of determining a rough classification further comprises classifying the single input image by a time of day without the use of any reference images.

3. The method of claim 1, wherein the step of determining a rough classification, comprises classifying the single input image by a weather condition without the use of any reference images.

4. The method of claim 1, wherein the single input image is generated from a camera carried on an aerial vehicle.

5. The method of claim 1, wherein the step of determining the optimal parameters further comprises selecting at least one of the parameters from the group consisting of: image smoothing, contrast enhancement, and multi-level image segmentation.

6. A method to improve the reliability of dismount detection from a single, low resolution image, the method comprising the steps of:
   obtaining a single input image; and,
   determining from the single input image a probability that a portion of the single input image corresponds to a dismount by applying a plurality of filtering techniques and image processing techniques without the use of any reference images, and
   fusing the results of the plurality of filtering techniques and image processing techniques to ascertain a probability of a dismount being present in the single input image without use of any reference images, wherein the plurality of filtering techniques comprise at least one secondary filter, wherein the at least one secondary filter comprises at least one of a contrast filter, a dynamic filter, a thermal filter, a change detection filter, a motion history filter, and a clutter identification filter.

7. The method of claim 6, wherein at least one of the plurality of filtering techniques comprises determining a rough classification of the single input image by type of scene illumination without the use of any reference images.

8. The method of claim 7, further comprising using the rough classification to determine optimal filter parameters for the plurality of filtering techniques without the use of any reference images.

9. The method of claim 8, wherein the optimal parameters include at least one of: image smoothing, contrast enhancement, and multilevel image segmentation.

10. The method of claim 6, wherein the step of determining a probability further comprises extracting a circumscribed fuzzy area from the single input image without the use of any reference images and utilizing the circumscribed fuzzy area in at least one of the plurality of filtering techniques.

11. The method of claim 10, wherein the circumscribed fuzzy area includes a blob, the at least one of the plurality of filtering techniques includes area filtering, and further comprising the step of applying area filtering to the blob, whereby portions of the single input image outside of the area determined by the area filtering are eliminated from evaluation without the use of any reference images.

12. The method of claim 11, further comprising a shape filter applied to an output of the at least one secondary filter to establish whether a shape of the blob corresponds to a shape of a human being.

13. The method of claim 12, further comprising the step of applying the shape filter only if the probability of the dismount is above a minimum probability and below a maximum probability.

14. The method of claim 6, further comprising the step of adding a dismount to a potential dismount list when the probability of a dismount exceeds at least one threshold value.

15. The method of claim 14, further including the step of ascertaining a location of a dismount added to the potential dismount list and utilizing the location of the dismount for dismount tracking.

16. The method of claim 7, wherein the step of determining a rough classification further comprises image classification by first analyzing the single input image to determine whether the scene involves one of: a sunny day, a cast shadow day, and night imagery without the use of any reference images.

17. The method of claim 16, wherein the image classification is used to dynamically adjust filter parameters prior to image smoothing, contrast enhancement, and multilevel segmentation.

18. The method of claim 17, further comprising blob extraction after performing at least one of image smoothing, contrast enhancement and multilevel segmentation.

19. The method of claim 18, further comprising filtering out extracted blobs that are outside a predetermined area.

20. The method of claim 19, further comprising filtering the blobs that are within the predetermined area utilizing at least one of the secondary filters.

21. The method of claim 20, wherein, by using the at least one secondary filters, a reliability of dismount detection is at least 98%.

22. The method of claim 21, wherein the reliability of the dismount detection increases when the probability of a dismount passed through the at least one secondary filters exceeds a predetermined minimum.

23. The method of claim 22, wherein the reliability of dismount detection increases if the probability of a dismount as determined by the at least one secondary filters exceeds a minimum and maximum probability.

24. The method of claim 21, wherein the reliability of dismount detection is increased by performing a shape filtering function on outputs from the at least one secondary filters when the probability of a dismount as determined by the at least one secondary filters exceeds a minimum probability but does not exceed a maximum probability.

25. A method of improving the reliability of dismount detection in a single, low resolution input image, the method comprising the steps of:

receiving a single low resolution input image from a high altitude, wherein the single low resolution input image has a potential dismount;

processing the single low resolution input image utilizing rough classification filtering without the reference images;

processing the single low resolution input image without the use of any reference images using at least two of: image smoothing, contrast enhancement, multilevel image segmentation, area filtering, blob extraction, contrast filtering, dynamic filtering, thermal filtering, change detection filtering, motion history filtering, clutter identification and shape filtering;

fusing the results of the processing step using at least two filters; and outputting a probability of at least 98% that the potential dismount is a verified dismount.

* * * * *